(12) United States Patent
Unger et al.

(10) Patent No.: US 8,919,988 B2
(45) Date of Patent: Dec. 30, 2014

(54) FLASHLIGHT INCLUDING BATTERY TYPE INDICATOR

(71) Applicant: Fiskars Brands, Inc., Madison, WI (US)

(72) Inventors: Brian Matthew Unger, Hillsboro, OR (US); Mark Allen Neubauer, Milwaukie, OR (US)

(73) Assignee: Fiskars Brands, Inc., Madison, WI (US)

( * ) Notice: Subject to any disclaimer, the term of this patent is extended or adjusted under 35 U.S.C. 154(b) by 0 days.

(21) Appl. No.: 13/802,296

(22) Filed: Mar. 13, 2013

(65) Prior Publication Data

US 2014/0268713 A1      Sep. 18, 2014

(51) Int. Cl.
F21L 4/00 (2006.01)
F21L 14/02 (2006.01)
F21L 4/08 (2006.01)
F21L 14/00 (2006.01)

(52) U.S. Cl.
CPC . F21L 4/08 (2013.01); F21L 14/02 (2013.01); F21L 7/00 (2013.01); F21L 14/00 (2013.01)
USPC ............ 362/183; 362/157; 362/194; 362/195

(58) Field of Classification Search
USPC ......... 362/109–114, 157, 194–195, 200–208, 362/802, 183, 227, 249.02, 171–173; 324/506; 320/107–115
See application file for complete search history.

(56) References Cited

U.S. PATENT DOCUMENTS

| | | | |
|---|---|---|---|
| 3,787,678 A | 1/1974 | Rainer | |
| 5,422,798 A * | 6/1995 | Osiecki et al. | ................ 362/206 |
| 6,366,028 B1 | 4/2002 | Wener et al. | |
| 7,048,408 B2 | 5/2006 | Dallas et al. | |
| 7,063,435 B2 | 6/2006 | Dallas et al. | |
| RE40,027 E * | 1/2008 | Matthews | ....................... 429/97 |
| D610,727 S | 2/2010 | Nyssen | |
| 7,690,815 B2 | 4/2010 | Dallas et al. | |

(Continued)

FOREIGN PATENT DOCUMENTS

DE    2020090 05 207 U1    12/2009

OTHER PUBLICATIONS

International Search Report and Written Opinion for PCT Application No. PCT/US2014/021982, mail date May 30, 2014, 10 pages.
U.S. Appl. No. 29/440,560, filed Dec. 21, 2012, Thomas.

(Continued)

Primary Examiner — Jong-Suk (James) Lee
Assistant Examiner — Zheng Song
(74) Attorney, Agent, or Firm — Foley & Lardner LLP

(57) ABSTRACT

A flashlight includes a battery compartment configured to alternatively receive a rechargeable battery or a non-rechargeable battery, a battery-type indicator located within the battery compartment, the indicator movable between a forward position and a rear position, wherein the indicator is biased to the rear position, and a switch that is closed by the indicator in the forward position, wherein the closed switch allows a battery inserted in the battery compartment to be recharged. With a rechargeable battery inserted in the battery compartment, the rechargeable battery engages the indicator and moves the indicator to the forward position, thereby closing the switch and allowing the rechargeable battery to be recharged while in the battery compartment. With a non-rechargeable battery inserted in the battery compartment, the indicator is in the rear position and the switch is not closed, thereby preventing the non-rechargeable battery from being recharged while in the battery compartment.

20 Claims, 3 Drawing Sheets

(56) References Cited

U.S. PATENT DOCUMENTS

| | | | |
|---|---|---|---|
| 7,780,309 B2* | 8/2010 | McMillan et al. | 362/202 |
| 7,909,478 B2 | 3/2011 | Dallas | |
| 2004/0130894 A1 | 7/2004 | Galli | |
| 2004/0145890 A1* | 7/2004 | Liao | 362/183 |
| 2005/0122715 A1* | 6/2005 | Furth et al. | 362/208 |
| 2006/0193128 A1 | 8/2006 | West | |
| 2008/0272714 A1* | 11/2008 | Noble et al. | 315/292 |
| 2009/0135588 A1* | 5/2009 | Furth et al. | 362/157 |
| 2010/0271814 A1* | 10/2010 | Messinger et al. | 362/183 |
| 2011/0216529 A1* | 9/2011 | Weng | 362/183 |

OTHER PUBLICATIONS

U.S. Appl. No. 29/432,848, filed Sep. 21, 2012, Thomas et al.
U.S. Appl. No. 13/719,102, filed Dec. 18, 2012, Unger et al.

* cited by examiner

FLASHLIGHT INCLUDING BATTERY TYPE INDICATOR

BACKGROUND

The present invention relates to a portable lighting device. More particularly, the present invention relates to a portable lighting device that is capable of functioning on batteries of multiple types and/or sizes.

Portable lighting devices, such as flashlights, are common. A typical flashlight includes a cylindrical battery compartment that forms the handle of the flashlight. The battery compartment typically houses one or more batteries of the same kind. A front end, or head, typically houses a bulb or lamp. A switch mechanism controls the flow of electricity between the batteries and the lamp. Portable lighting devices are offered in a multitude of shapes and sizes and provide many options for a variety of disciplines including but not limited to military, fire fighting, police, industry, camping, boating, outdoor sports, scuba, hunting, and general household use.

SUMMARY

One embodiment of the invention relates to a flashlight including a battery compartment configured to alternatively receive a rechargeable battery or a non-rechargeable battery, a battery-type indicator located within the battery compartment, the indicator movable between a forward position and a rear position, wherein the indicator is biased to the rear position, and a switch that is closed by the indicator in the forward position, wherein the closed switch allows a battery inserted in the battery compartment to be recharged. With a rechargeable battery inserted in the battery compartment, the rechargeable battery engages the indicator and moves the indicator to the forward position, thereby closing the switch and allowing the rechargeable battery to be recharged while in the battery compartment. With a non-rechargeable battery inserted in the battery compartment, the indicator is in the rear position and the switch is not closed, thereby preventing the non-rechargeable battery from being recharged while in the battery compartment.

Another embodiment of the invention relates to a portable lighting device including a light source configured to be powered by either a rechargeable battery or a non-rechargeable battery, a battery compartment configured to alternatively receive a rechargeable battery or a non-rechargeable battery, a battery-type indicator located within the battery compartment, the indicator configured to detect a difference between a rechargeable battery and a non-rechargeable battery, a switch that is closed by the indicator when the difference between a rechargeable battery and a non-rechargeable battery a rechargeable battery is detected, wherein the closed switch allows a battery inserted in the battery compartment to be recharged. With a rechargeable battery inserted in the battery compartment, the rechargeable battery engages the indicator, thereby closing the switch and allowing the rechargeable battery to be recharged while in the battery compartment. With a non-rechargeable battery inserted in the battery compartment, the indicator is not engaged and the switch is not closed, thereby preventing the non-rechargeable battery from being recharged while in the battery compartment.

Another embodiment of the invention relates to a flashlight including a body, a head assembly attached to one end of the body, the head assembly including a light source, a rear assembly removably attached to the opposite end of the body, a battery compartment defined within the body and closed at one end by the rear assembly, the battery compartment configured to alternatively receive a rechargeable battery or a non-rechargeable battery for powering the light source, and a switch that is closed by the indicator in the forward position, wherein the closed switch allows a battery inserted in the battery compartment to be recharged. With a rechargeable battery inserted in the battery compartment, the rechargeable battery engages the indicator and moves the indicator to the forward position, thereby closing the switch and allowing the rechargeable battery to be recharged while in the battery compartment. With a non-rechargeable battery inserted in the battery compartment, the indicator is in the rear position and the switch is not closed, thereby preventing the non-rechargeable battery from being recharged while in the battery compartment.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DESCRIPTION

Figure 1:
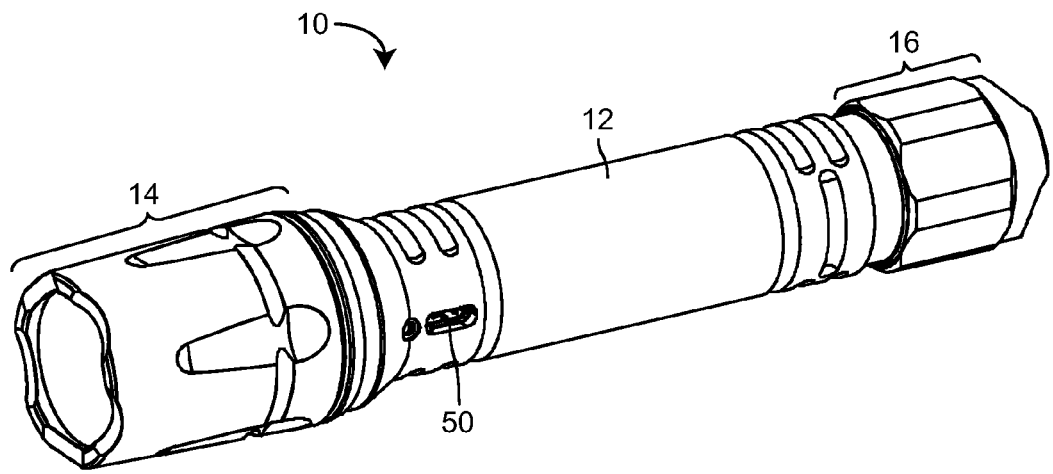
FIG. 1 is a front perspective view of a portable lighting device, according to an exemplary embodiment.

Referring to FIG. 1, a portable lighting device, shown as a flashlight 10, is illustrated in accordance with an exemplary embodiment. Flashlight 10 generally includes a body 12, a head assembly 14, and a rear assembly 16.

Body 12 is shown as having a cylindrical shape but may have other shapes as is known in the art. Body 12 may be made of metal, plastic, or other materials. Body 12 may contain a battery compartment configured to hold a battery or another power source as well as internal wiring and/or a switch, which may be embodied in a variety of types and configurations as is generally known in the art.

Head assembly 14 is provided with a threaded connection to rotationally couple head assembly 14 to body 12. In alternative embodiments, body 12 and head assembly 14 may be a single integral piece, secured with adhesive, snapped into position, or otherwise fastened. Head assembly 14 may be made of metal, plastic, or other materials.

Rear assembly 16 is provided with a threaded connection to rotationally couple rear assembly 16 to body 12. In alternative embodiments, body 12 and rear assembly 16 may be a single integral piece, secured with adhesive, snapped into position, or otherwise fastened. Rear assembly 16 is removable to provide access to battery compartment 24.

Figure 2:
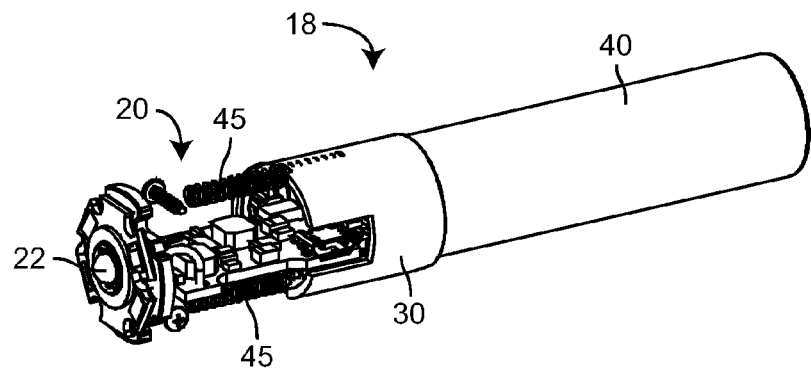
FIG. 2 is a front perspective view of the interior assembly of a portable lighting device, according to an exemplary embodiment.

Referring to FIG. 2, the interior assembly 18 of flashlight 10 is shown in greater detail. Interior assembly 18 generally includes circuitry 20, one or more bulbs or light sources 22, and one or more batteries (e.g., battery 40) in a battery compartment 24 (see FIG. 4A). Circuitry 20 is coupled to head assembly 14 or body 12 of flashlight 10. Light source 22 is coupled to circuitry 20. In another embodiment, light source 22 may be coupled to body 12. Light source 22 may be a high powered light emitting diode (LED), a conventional bulb, such as an incandescent, halogen, or krypton bulb, or any other type of source of light.

Light source 22 is electrically connected to the battery in battery compartment 24. Head assembly 14 may include a front contact coupled to the rear of circuitry 20.

Battery compartment 24 includes one or more sub-compartments configured to hold one or more batteries. Battery compartment 24 may be formed within body 12 or may be integral with body 12. Battery compartment 24 may be configured to hold two or more different types and sizes of batteries, in either a series or parallel arrangement, according to an exemplary embodiment.

Battery compartment 24 may be shaped and sized (e.g. lengthened, widened) to receive various types of batteries. For example, battery compartment 24 may receive one or more rechargeable batteries such as AA rechargeable batteries, AAA rechargeable batteries, 18650 rechargeable batteries, etc. As another example, battery compartment 24 may receive one or more non-rechargeable batteries such as AA batteries, AAA batteries, CR123A batteries, C batteries, D batteries, etc. Battery compartment 24 may receive any combination of chargeable and non-chargeable batteries. Battery compartment 24 may be made of plastic, metal, or other materials.

Rear assembly 16 includes one or more rear contacts configured to make contact with the negative terminals of a battery. Rear assembly 16 further includes a spring 26 (shown in FIG. 4) to hold the one or more batteries in battery compartment 24 in place. Rear assembly 16 and/or battery compartment 24 are configured to positively retain (e.g. hold, surround, contain, etc.) batteries of multiple types and sizes. Rear assembly 16 may be made of metal, plastic, or other materials.

When a switch 26 (shown in FIG. 3) of flashlight 10 is activated (e.g., depressed, engaged, etc.), a circuit is completed (e.g., closed) between light source 22, circuitry 20, and the one or more batteries being utilized in battery compartment 24. The batteries then power light source 22 via circuitry 20.

A user may uncouple rear assembly 16 from body 12 to insert batteries into battery compartment 24. For example, battery compartment 24 may be configured to receive a rechargeable battery (e.g., a 18650 battery) or a non-rechargeable battery (e.g., a CR123 battery). Batteries of different types and sizes may have different voltages. Circuitry 20 may be configured to automatically adjust or convert whichever input voltage it receives from the chosen battery to the specific operating voltage required by light source 22.

Figure 3:
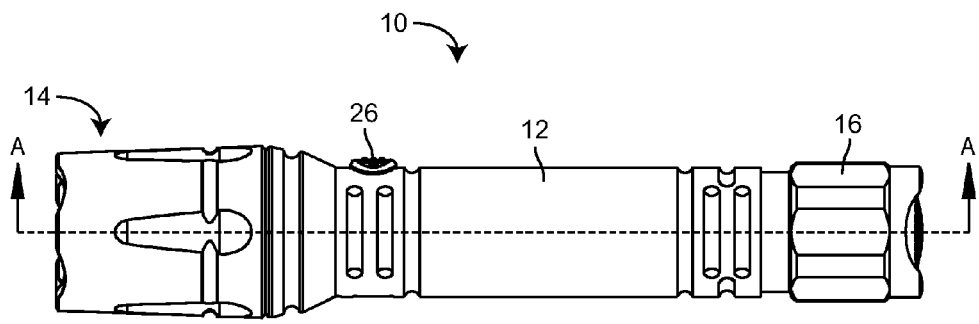
FIG. 3 is a side elevation view of a portable lighting device, according to an exemplary embodiment.
Figure 4A:
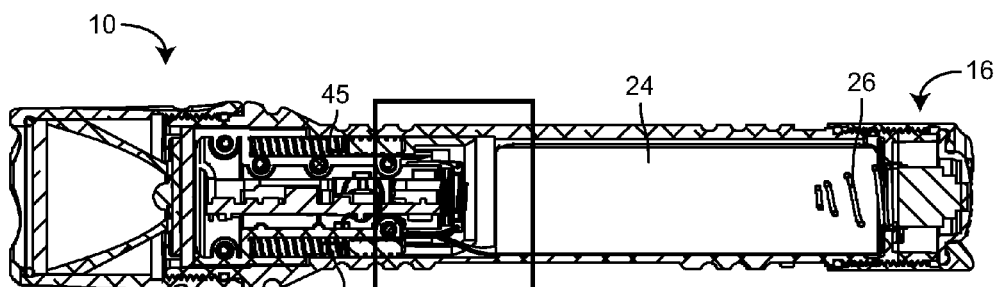
FIG. 4A is a section view taken generally along line A-A of FIG. 3, illustrating an empty battery compartment, according to an exemplary embodiment.
Figure 4B:
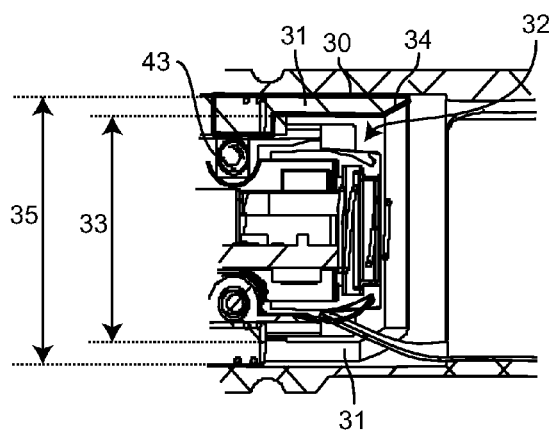
FIG. 4B is an enlarged view of a portion of the section view of FIG. 4A.

Referring now to FIG. 3, a side elevation view of flashlight 10 is shown. Referring also to FIGS. 4A-B, a section view taken generally along line A-A of flashlight 10 is shown. Battery compartment 24 is shown as empty.

Referring to FIG. 4B, flashlight 10 assembly is shown to include an indicator 30. Indicator 30 is a mechanical device used to detect a battery size and battery type. As shown in FIGS. 4-6, indicator 30 is a slidable annular sleeve movable relative to head assembly 14. When a battery is inserted into battery compartment 24 during use, indicator 30 may or may not be actuated (e.g., pushed forward) in the flashlight 10 assembly based on the type and size of the battery. Indicator 30 is labeled in multiple areas in FIG. 4 to illustrate the different portions of indicator 30.

Figure 5A:
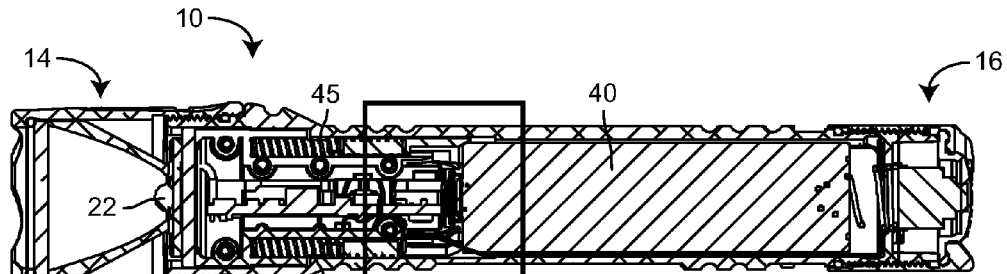
FIG. 5A is a section view taken generally along line A-A of FIG. 3, illustrating a battery compartment including a rechargeable battery, according to an exemplary embodiment.
Figure 5B:
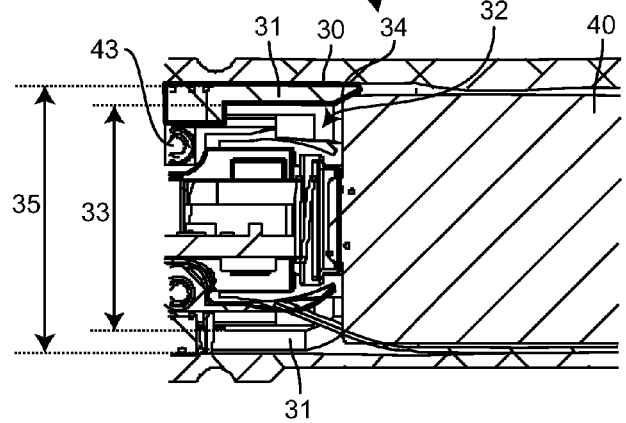
FIG. 5B is an enlarged view of a portion of the section view of FIG. 5A.
Figure 6A:
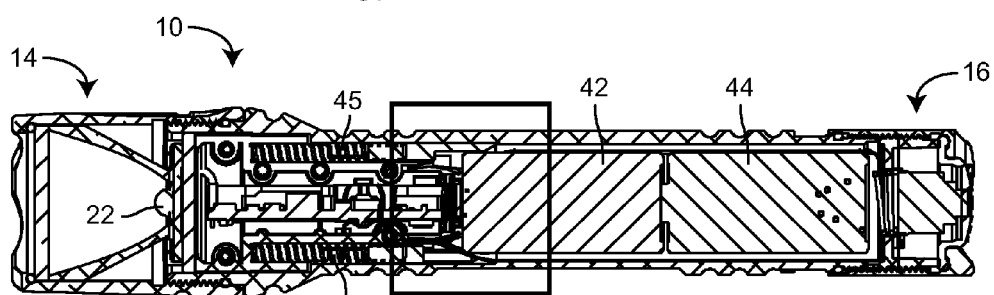
FIG. 6A is a section view taken generally along line A-A of FIG. 3, illustrating a battery compartment including a non-rechargeable battery, according to an exemplary embodiment.
Figure 6B:
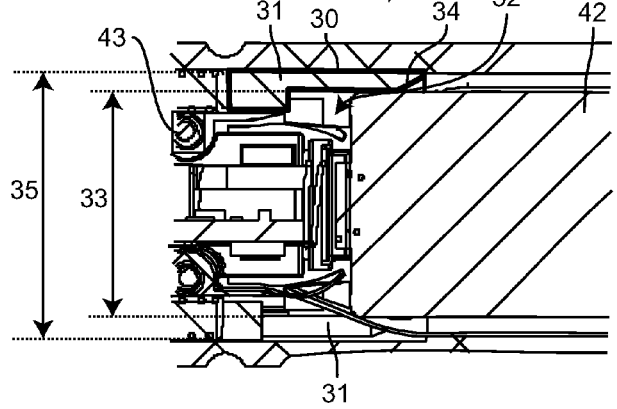
FIG. 6B is an enlarged view of a portion of the section view of FIG. 6A.

In the embodiment shown in FIGS. 4-6, indicator 30 is a sleeve having an outer wall 31 that defines an interior chamber 32. The diameter 33 of interior chamber 32 is sized so that a non-chargeable battery will be received within interior chamber 32 (as shown in FIGS. 6A-B). Outer wall 31 includes a rear surface 34 that extends to an outer diameter 35. As illustrated, rear surface 34 is angled or beveled. Diameters 33 and 35 are sized so that a rechargeable battery will contact rear surface 34 when being inserted in battery chamber or compartment 24, thereby actuating indicator 30 by moving it forward towards head assembly 14. Indicator 30 is movable between a forward or actuated position (FIGS. 5A-B) and a rear or non-actuated position (FIGS. 6A-B). One or more springs or biasing members 45 bias the indicator 30 to the rear position.

Battery compartment 24 is configured to receive either a rechargeable battery or a non-rechargeable battery for use with flashlight 10. The rechargeable battery is generally slightly larger (e.g., wider or thicker) than the non-rechargeable battery. Indicator 30 is configured such that a rechargeable wide battery is large enough to actuate indicator 30, thereby moving indicator 30 to the forward position, but the non-rechargeable battery is too narrow to actuate indicator 30, leaving indicator 30 in the rear position.

Therefore, by determining if the battery in battery compartment 24 actuates indicator 30, circuitry 20 may determine if the battery is a rechargeable or non-chargeable.

Referring to FIGS. 5A-B, flashlight 10 assembly is shown, including a rechargeable battery 40 in battery compartment 24. In the embodiment of FIG. 5, battery 40 actuates indicator 30 by pushing indicator 30 forward towards head assembly 14 and circuitry 20, thereby closing a switch or contact 43 to provide an indication that a rechargeable battery is currently being used in flashlight 10 operation. The closed switch 43 allows the battery inserted in the battery compartment 24 (i.e., the rechargeable battery 40) to be recharged via a power supply as described below.

Referring to FIGS. 6A-B, flashlight 10 assembly is shown, including two non-rechargeable batteries 42, 44. In the embodiment of FIGS. 6A-B, the non-rechargeable battery is not wide enough to actuate indicator 30, leaving the switch open and thereby providing an indication that a non-rechargeable battery is currently being used in flashlight 10 operation.

Comparing the embodiments of FIGS. 5-6, indicator 30 is shown in an actuated position in FIGS. 5A-B, while indicator 30 is shown not actuated in FIGS. 6A-B. The actuation of indicator 30 is shown pushing forward indicator 30; in other embodiments, the actuation of indicator 30 may force indicator 30 into other directions (e.g., radially outwards) such that the change in position of indicator 30 may be interpreted as being caused by a particular type of battery.

In an exemplary embodiment, the actuation of indicator 30 may serve as a connection point. For example, when indicator 30 is actuated (e.g., pushed forward), a normally open electrical path may be closed. In some embodiments, indicator 30 pushes on a bridge connecting rechargeable battery 40 to circuitry.

The connection created between battery 40 and circuitry 20 may then be used to recharge the battery while the battery is in battery compartment 24. For example, flashlight 10 may include a port 50 as shown in FIG. 2 (e.g., a universal serial bus (USB) port) to which a power supply may connect. When indicator 30 is actuated, indicating that a rechargeable battery is in battery compartment 24, a normally open connection (e.g., switch 43) between rechargeable battery 40 and port 50 may be closed and a circuit is established, so that rechargeable battery 40 is charged. This allows a user to charge rechargeable battery 40 without removing battery 40 from flashlight 10. Further, this allows a user to charge battery 40 without use of a cartridge or extra equipment. If there is a non-rechargeable battery in battery compartment 24, indicator 30 is not actuated, and a connection between port 50 and the battery is not closed, leaving the circuit open and preventing charging of a non-rechargeable battery.

In other exemplary embodiments, flashlight 10 may be another type of portable lighting device, such as a headlamp or lantern.

The construction and arrangement of the portable lighting device shown and described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes, and proportions of the orientations, etc.) without materially departing from the novel teachings and advantages of the subject matter recited in the description. For example, elements shown as integrally formed may be constructed of multiple parts or elements, the position of elements may be reversed or otherwise varied, and the nature or number of discrete elements or positions may be altered or varied. Other substitutions, modifications, changes, and omissions may be made in the design, operating conditions and arrangement of the exemplary embodiments without departing from the scope of the invention as expressed in the appended claims.

What is claimed is:

1. A flashlight, comprising:
a light source configured to be powered by either a rechargeable battery or a non-rechargeable battery;
a light switch;
a light circuit electrically coupling the light source and the light switch;
a battery compartment configured to alternatively receive a rechargeable battery or a non-rechargeable battery;
a battery-type indicator located within the battery compartment, the indicator movable between a forward position and a rear position, wherein the indicator is biased to the rear position;
a recharge switch that is closed when the indicator is in the forward position, wherein the closed recharge switch allows a battery inserted in the battery compartment to be recharged; and
a recharge circuit electrically coupling the recharge switch to a power supply;
wherein, in a first mode of operation, with a rechargeable battery inserted in the battery compartment, the rechargeable battery engages the indicator and moves the indicator to the forward position, thereby closing the recharge switch and completing the recharge circuit to recharge the rechargeable battery with power from the power supply, and wherein the rechargeable battery is electrically coupled to the light circuit to power the light source; and
wherein, in a second mode of operation with a non-rechargeable battery inserted in the battery compartment, the indicator is in the rear position and the recharge switch is not closed so that the recharge circuit is open, thereby preventing the non-rechargeable battery from being recharged, and wherein the non-rechargeable battery is electrically coupled to the light circuit to power the light source.

2. The flashlight of claim 1, wherein the indicator comprises a wall extending between an inner diameter and an outer diameter;
wherein the rechargeable battery has a diameter that is greater than the inner diameter of the indicator so that the rechargeable battery engages the indicator when inserted into the battery compartment; and
wherein the non-rechargeable battery has a diameter that is less than the inner diameter of the indicator so that the non-rechargeable battery does not engage the indicator when inserted into the battery compartment.

3. The flashlight of claim 2, further comprising:
a port for connecting the power supply to recharge the rechargeable battery.

4. The flashlight of claim 3, wherein the port comprises a universal serial bus port.

5. The flashlight of claim 1, wherein the indicator comprises an annular sleeve that defines an interior chamber.

6. The flashlight of claim 5, wherein the non-rechargeable battery is received within the interior chamber when the non-rechargeable battery is inserted into the battery compartment.

7. The flashlight of claim 6, wherein the sleeve comprises an outer wall that extends between an outer diameter and an inner diameter, wherein the inner diameter is the diameter of the interior chamber.

8. The flashlight of claim 7, wherein the outer wall includes a rear surface.

9. The flashlight of claim 8, wherein the rear surface is angled.

10. A portable lighting device, comprising:
a light source configured to be powered by either a rechargeable battery or a non-rechargeable battery;
a light switch;
a light circuit electrically coupling the light source and the light switch;
a battery compartment configured to alternatively receive a rechargeable battery or a non-rechargeable battery;
a battery-type indicator located within the battery compartment, the indicator configured to detect a difference between a rechargeable battery and a non-rechargeable battery;
a recharge switch that is closed by the indicator when the difference between a rechargeable battery and a non-rechargeable battery is detected; and
a recharge circuit electrically coupling the recharge switch to a power supply, wherein the closed recharge switch allows a battery inserted in the battery compartment to be recharged;
wherein, in a first mode of operation, with a rechargeable battery inserted in the battery compartment, the rechargeable battery engages the indicator, thereby closing the recharge switch and completing the recharge circuit to recharge the rechargeable battery with power from the power supply, and wherein the rechargeable battery is electrically coupled to the light circuit to power the light source; and wherein, in a second mode of operation, with a non-rechargeable battery inserted in the battery compartment, the indicator is not engaged and the recharge switch is not closed so that the recharge circuit is open, thereby preventing the non-rechargeable battery from being recharged, and wherein the non-rechargeable battery is electrically coupled to the light circuit to power the light source.

11. The portable lighting device of claim 10, wherein the indicator comprises a wall extending between an inner diameter and an outer diameter;
   wherein the rechargeable battery has a diameter that is greater than the inner diameter of the indicator so that the rechargeable battery will engage the indicator when inserted into the battery compartment; and
   wherein the non-rechargeable battery has a diameter than is less than inner diameter of the indicator so that the non-rechargeable battery does not engage the indicator when inserted into the battery compartment.

12. The portable lighting device of claim 11, further comprising:
   a port for connecting the power supply to recharge the rechargeable battery.

13. The portable lighting device of claim 12, wherein the port comprises a universal serial bus port.

14. The portable lighting device of claim 10, wherein the indicator comprises an annular sleeve that defines an interior chamber.

15. The portable lighting device of claim 14, wherein the non-rechargeable battery is received within the interior chamber when the non-rechargeable battery is inserted into the battery compartment.

16. The portable lighting device of claim 15, wherein the sleeve comprises an outer wall that extends between an outer diameter and an inner diameter, wherein the inner diameter is the diameter of the interior chamber.

17. The portable lighting device of claim 16, wherein the outer wall includes a rear surface.

18. The portable lighting device of claim 17, wherein the rear surface is angled.

19. A flashlight, comprising:
   a body including a port for connecting a power supply;
   a head assembly attached to one end of the body, the head assembly including a light source configured to be powered by either a rechargeable battery or a non-rechargeable battery;
   a light switch;
   a light circuit electrically coupling the light source and the light switch;
   a rear assembly removably attached to an opposite end of the body;
   a battery compartment defined within the body and closed at one end by the rear assembly, the battery compartment configured to alternatively receive a rechargeable battery or a non-rechargeable battery for powering the light source;
   a battery-type indicator located within the battery compartment, the indicator movable between a first position and a second position;
   a recharge switch that is closed by the indicator in the first position; and
   a recharge circuit electrically coupling the recharge switch to the port, wherein the closed recharge switch allows a battery inserted in the battery compartment to be recharged;
   wherein, in a first mode of operation, with a rechargeable battery inserted in the battery compartment, the rechargeable battery engages the indicator and moves the indicator to the first position, thereby closing the switch and completing the recharge circuit to allow the rechargeable battery to be recharged, and wherein the rechargeable battery is electrically coupled to the light circuit to power the light source; and
   wherein, in a second mode of operation, with a non-rechargeable battery inserted in the battery compartment, the indicator is in the second position and the recharge switch is not closed so that the recharge circuit is open, thereby preventing the non-rechargeable battery from being recharged, and wherein the non-rechargeable battery is electrically coupled to the light circuit to power the light source.

20. The flashlight of claim 19, wherein the port comprises a universal serial bus port.

\* \* \* \* \*